US005374474A

United States Patent [19]

Pratt et al.

[11] Patent Number: 5,374,474

[45] Date of Patent: Dec. 20, 1994

[54] COMPOSITE BOARD AND METHOD OF MANUFACTURE

[75] Inventors: Ronald Pratt, North Powder; John Chedester, Baker City; John Pommerening, Portland, all of Oreg.

[73] Assignee: Earth Partners, Inc., Baker City, Oreg.

[21] Appl. No.: 765,822

[22] Filed: Sep. 26, 1991

[51] Int. Cl.[5] .......................... B27N 3/10; B32B 31/20

[52] U.S. Cl. .................................. 428/220; 52/309.13; 52/DIG. 7; 156/62.2; 156/307.1; 156/331.4; 264/128; 264/331.16; 428/425.1

[58] Field of Search ................. 156/62.2, 307.1, 331.4; 264/128, 331.16; 428/220, 425.1

[56] References Cited

U.S. PATENT DOCUMENTS

| | | | |
|---|---|---|---|
| 3,666,593 | 5/1972 | Lee . | |
| 3,718,536 | 2/1973 | Downs et al. . | |
| 3,919,017 | 11/1975 | Shoemaker et al. | 156/62.2 |
| 3,930,110 | 12/1975 | Shoemaker et al. | 428/424 |
| 4,012,561 | 3/1977 | Doughty et al. . | |
| 4,100,328 | 7/1978 | Gallagher | 428/407 |
| 4,111,730 | 9/1978 | Balatinecz . | |
| 4,131,705 | 12/1978 | Kubinsky | 428/106 |
| 4,148,952 | 4/1979 | Nelson et al. . | |
| 4,209,433 | 6/1980 | Hse | 264/109 |
| 4,221,751 | 9/1980 | Haataja | 264/119 |
| 4,268,565 | 5/1981 | Luck et al. . | |
| 4,279,788 | 7/1981 | Lambuth | 156/331.4 |
| 4,382,108 | 5/1983 | Carroll et al. | 428/326 |
| 4,505,868 | 3/1985 | Krueger et al. | 264/108 |
| 4,528,154 | 7/1985 | Hguyen | 264/109 |
| 4,609,513 | 9/1986 | Isreal . | |
| 4,692,292 | 9/1987 | Kollmeier | 264/126 |
| 4,740,575 | 4/1988 | Nguyen | 528/26 |
| 4,742,144 | 5/1988 | Nguyen et al. | 528/26.5 |
| 4,772,442 | 9/1988 | Trout et al. | 264/109 |
| 4,999,390 | 3/1991 | Bentsen . | |
| 5,092,953 | 3/1992 | Derby et al. | 156/331.7 |
| 5,096,945 | 3/1992 | Sun | 524/13 |

*Primary Examiner*—James C. Cannon
*Attorney, Agent, or Firm*—Edward S. Irons

[57] ABSTRACT

Composite boards made primarily from recycled waste paper and methods for production of such boards are described.

8 Claims, No Drawings

COMPOSITE BOARD AND METHOD OF MANUFACTURE

FIELD OF THE INVENTION

This invention provides a practical and environmentally acceptable means for recycling large quantities of waste paper and paperboard. More particularly, this invention relates to commercially useful composite boards made primarily from recycled waste paper and paperboard, to methods for the manufacture of such boards, and products fabricated therefrom.

BACKGROUND OF THE INVENTION

The supply of natural wood fibers is restricted and has been curtailed. It is estimated that 1991 federal timber harvest levels for the Northwest United States will be reduced to from about 20% to about 40% of the 1990 levels.

Disposal of ever-increasing quantities of waste paper, particularly in urban areas, is an important environmental problem. Scarcity of landfill areas, and air pollution consequent from incineration render the development of alternative disposal methods imperative.

Environmentally acceptable recycling technology is required to concomitantly alleviate the waste paper disposal problem and to ease the demand for natural wood products.

Particle board, medium density fiberboard, hardboard, and other composites based on wood are widely used. The technology for manufacturing these wood-based composites is well developed. Prior to this invention, however, a practical and environmentally acceptable method for preparing useful composites entirely from waste paper or paperboard had not been developed.

U.S. Pat. No. 4,111,730 recognizes some of the benefits from waste paper recycling. To provide a paperboard product, waste paper is reduced to flake, conditioned to a low moisture content, blended with a thermosetting urea or phenol-formaldehyde resin, pressed into a mat, and cured. These board products may have a moisture content of 10–12%, a density of 19–75 pounds per cubic foot, and may be from 0.25 to 1.50 inches in thickness. The phenol-formaldehyde resin content renders these board products environmentally undesirable.

A composite board made from 100% waste paper fiber and melamine isocyanate urea-formaldehyde resin is described in Deppe, "The Utilization of Wastepaper and Refuse Fiber Material for Particle Board and MDF" Proceedings of the Nineteenth Washington State University International Particle Board/Composite Materials Symposium (1985).

U.S. Pat. No. 3,718,536 describes a particle board composed of shreds of thermoplastic resin coated paper. A thermoplastic resin binder such as polyethylene or polypropylene is added to the plastic coated paper shreds to facilitate composite board manufacture.

Various composite boards have been formulated from wood particles or fibers with isocyanate binders. See, e.g., Polyurethanes Forest Products Technical Paper (1989) (published by ICI Polyurethanes Forest Products Group, Martha Grove Road, West Deptford, N.J. 08066. U.S. Pat. No. 4,311,554 describes an incombustible particle board comprising a mixture of wood chips, a mineral substance and a binder which may be an isocyanate adhesive.

SUMMARY OF THE INVENTION

This invention provides an efficient, environmentally acceptable, formaldehyde-free method for converting waste paper or paperboard into useful composite board products. Pursuant to the invention, waste paper having a moisture content of from about 5% to 10% by weight and a bulk density of from about 1.0 to about 40 pounds per cubic foot is refined to provide particles having a bulk density of from about 3 to about 6 pounds per cubic foot or fibers having a bulk density of about one pound per cubic foot.

The refined particles or fibers are blended with a thermosetting isocyanate resin, for example, an aqueous emulsion of a polymeric diphenylmethane polyisocyanate such as Rubinate MF-178 available from Imperial Chemical Industries (ICI). A wax emulsifion may be included in the resin emulsion to improve water resistance of the final product. The blended material preferably contains from about 8% to about 12% water by weight, about 2% to about 4% resin by weight at 100% solids and may contain from about 0.5 to about 2% by weight wax at 100% solids. The bulk density is slightly higher than that of the refined particle or fiber raw material prior to blending.

The blended resin containing product is formed into a mat. Mats formed from resin blends with paper particles may be processed either in a caul or a caulless system. Mats formed from refined waste paper or paperboard fibers are preferably processed on a caulless system.

The mats, after trimming if necessary or desired, are pressed at a pressure not exceeding 1000 psi at a temperature of from about 280° to about 320° F. for about 1 to about 20 minutes. The composite board products of the pressing step are cooled, conditioned and trimmed as desired.

The final paper particle or fiber board products after normalization have a density of from about 50 to about 75 pounds per cubic foot, an internal resin to fiber bond strength of at least 80 psi and a modulus of rupture of at least 3000 psi modules of elasticity at least 300,000 psi. After a 24-hour soak cycle, the board products have water absorption of less than 25% by weight and a thickness swell of less than 15%. The boards may be of any desired thickness. Typical board products may be from about 0.125 inches to about 1.00 inches thick. A plurality of thin boards may be laminated to provide a stronger and thicker end product.

The formaldehyde-free board products of the invention meet or exceed National Particleboard Association requirements for comparable products and ANSI-208.1 (particle board) and ANSI-208.2 (medium density fiber board) (MDF) building code requirements. These boards also meet specifications for flat door skins.

DETAILED DESCRIPTION OF THE INVENTION

The method aspect of the invention entails some or all of the sequential steps of (i) preparation of raw material (e.g., newsprint, waste paper, corrugated or uncorrugated paperboard, kraft paper) for refining, (ii) refining, (iii) blending the refined product with thermosetting isocyanate resin, (iv) mat formation, (v) mat pressing, and (vi) cooling and, if appropriate, (vii) final preparation. Quality control is preferably implemented throughout the process.

Preparation for Refining

Foreign material, such as rocks and metal objects, are removed from the waste paper raw material before refining to protect equipment and maintain product quality.

Refining

To produce a paper particle board, only a single stage or machine may be required to reduce the raw material to an appropriate particle size. Bulk density of the refined particle product is preferably from about 2.5 to about 6 pounds per cubic foot. Hammer mills or functionally equivalent machines may be used.

Two refining stages are preferably used to produce fibers from paper raw material. Palm size material is produced in the first stage, and preferably has a bulk density of about three pounds per cubic foot. Machinery supply by Shred-Tech or SSI Shredding Systems yields an acceptable primary stage product. The product of the second refining step preferably has a bulk density of from about 0.8 to about 1.6 pounds per cubic foot. Secondary refining may be accomplished with machinery supplied by Andritz or Sprout Bauer.

Blending

The refined particle or fiber product is blended with an appropriate thermosetting isocyanate resin. Preferably the resin is utilized in the form of an aqueous emulsion to increase resin mass and facilitate even distribution of the resin onto the surfaces of the paper particles or fibers. Water emulsifiable polymeric methylene diisocyanate (PMDI) and diphenylmethane diisocyanate (MDI) resins are preferred. Such resins are available from ICI Polyurethanes as Rubinate 178 and 184. Rubinate 178 is appropriate for application in water emulsification. Rubinate 184 is applied directly.

Advantages of these isocyanate resins as compared to urea formaldehyde and phenol-formaldehyde in wood particle board manufacture are described in ICI Polyurethanes Forest Products Technical Papers. These advantages are said to include faster processing rates, lower press temperatures, elimination of formaldehyde release, lower dosages and longer binder storage life.

Blending is preferably controlled by a feedback system which determines the amount of resin added as a function of the moisture content on a dry basis and of the weight of the refined product. Resin, preferably aqueous resin emulsion, is distributed by air, airless or spinning disc head atomization.

A wax emulsion will be added, preferably concurrently with the resin. The wax functions as a moisture inhibitor and thus controls linear expansion. Waxes useful for this purpose are available from ICI, Bordon or Hercules.

The product of the blending stage preferably has a moisture content of from bout 8% to about 12% by weight, a resin content of from about 2% to about 4% by weight at 100% solids, and a wax content of from about 0.5 to about 2% by weight at 100% solids.

Mat Formation

The paper particle or fiber resin blend is formed into mats which are hot pressed. A metering system is preferably used to insure that consistently uniform mats are laid down.

Any of three modes of post-mat formation processing may be used to produce a final board product. The mat may be formed on a caul where it remains during the hot pressing stage. Alternatively, the mat may be formed on the caul and prepressed at ambient temperature to provide mat integrity sufficient to permit removal from the caul and transportation to the hot press. In a preferred practice, a caulless system is utilized to form a continuous mat on a belt which moves from the mat former through a preprocessor to provide mat integrity and thence into the hot press.

To produce boards from refined newsprint fibers, a caulless system is preferred. A vacuum mat former deposits refined fiber onto a forming screen. The mat then passes through a shave-off head and thence through a precompressor. The shave-off head may be provided with mat weight sensors and a moisture meter, and which may be followed by a weigh scale to control mat weight. After passage through the precompressor, mat edges may be trimmed, and the continuous mat may be separated into individual mats by a cut-off saw. Mats which are too heavy or too light may be rejected and recycled.

Mat Pressing

Mats formed from blends of paper particles or fibers with resin and wax are hot pressed to provide the composite board products of the invention.

Specific press cycles, techniques, temperatures and pressures will be a function of the particular board product to be produced.

The press platens or cauls are preferably coated with a release agent.

In the preferred practice of the invention for most composite board products, mats containing from about 2% to about 4% by weight resin at 100% solids are appropriately pressed at about 280° to about 320° F. for about 1 to about 20 minutes at a maximum pressure of about 1000 psi. Mats yield board products having a thickness of from about 0.125 to about 1.00 inches, a moisture content of from about 7% to about 12% by weight, an internal particle or fiber to resin bond of at least about 90 psi, and a modulus of rupture of at least 300 psi. The boards, after a 24-hour soak test, have a water absorption of less than 25% by weight and a thickness swell of less than 15% and a modulus of elasticity of 300,000.

Cooling and Final Preparation

Pressed boards may be stored for acclimation to ambient temperature and humidity. Final preparation may include trimming, sizing and application of a surface finish.

These board products may be laminated or used individually. Among other things, these board products and laminates are useful as substrates for furniture, door facings, forms for cement, skins for foam-filled panels and building underlayments.

EXAMPLE I

This example illustrates the practice of the invention to produce a dry process hardboard approximately ⅛" thick from newsprint fibers.

Newsprint was subjected to a first step of refining in a rotary shear shredder to yield a product having a bulk density of about 5–10 pounds comprising particles approximately one inch and larger in size. Second stage refining of these particles in an atmospheric hammermill yielded a product having a bulk density of about one pound per cubic foot.

After storage, the product of the second stage refining was blended with an aqueous emulsion containing 50% by weight of polymeric diphenylmethane diisocyanate (ICI Rubinate MF-178) and an aqueous emulsion of wax specifically applied by air atomization. The blended material had a moisture content of about 10% by weight and a resin content of 3.0% by weight at 100% solids.

The blended product was formed into a mat on a vacuum screen. The formed mat was transferred to a caul, hot pressed for one minute and 40 second at a temperature of about 300° F. at a maximum pressure of 900 psi and cooled. The final board product had a moisture content of about 7% by weight, a thickness of about 0.125 inch, a density of about 68 pounds per cubic foot, an internal resin to fiber bond of over 200 psi, a modulus of rupture greater than 6000 psi and a modulus of elasticity of at least 700,000. Water absorption after a 24-hour soak test was less than 25% by weight, and thickness swell was less than 15% by weight.

These physical properties show that the board product meets specifications for flat door skins.

EXAMPLE II

This example illustrates the practice of the invention to produce a laminate from ⅛" board products as described in Example I.

Finished ⅛" board panels are allowed to adjust to ambient relative humidity. Cold set laminate binder is applied by top and bottom rollers. Only the top side of selected panels will have binder applied, e.g., if making a 4 ply laminate, only three of the four panels will have binder applied, the fourth panel without glue applied will be placed on top of the other three panels. This process is repeated until the holding rack is full. The panels are then transferred to a low pressure press (maximum 100 psi.) and held under pressure for up to 20 minutes.

We claim:

1. A composite board consisting essentially of recycled newsprint paper fibers and a thermoset polyisocyanate resin, said board being from about 0.125 to about 1.00 inch thick, being formed at a pressure of from about 900 psi to 1000 psi and having a density of 50-75 pounds per cubic foot, an internal fiber to resin bond of at least 190 pounds per square inch, with a resin content of from about 2% to about 4% by weight, and a modulus of rupture of at least 3000, a modulus of elasticity of at least 300,000 and, after a 24-hour soak test, water absorption of not more than 25% and thickness swell of not more than 15%.

2. A composite board as defined by claim 1 in which said resin is a diphenylmethane diisocyanate resin.

3. A method for preparing a composite board from waste newsprint paper having a moisture content of from about 5% to about 10% by weight which method consists essentially of:

(i) refining said waste paper to provide a fiber product having a bulk density of from about 1 to about 5 pounds per cubic foot;

(ii) blending said fiber product with an aqueous emulsion of a thermosetting polyisocyanate resin to provide a blended product having a moisture content of from about 8% to about 12% by weight, and a resin content of from about 2% to about 4% by weight on a 100% solid basis;

(iii) forming said blended product into a mat; and (iv) pressing said mat at a temperature of from about 280° F. to about 320° F. to a pressure of from about 900 psi to about 1000 psi and for a time period of from about 1 to about 20 minutes to produce a composite board from about 0.125 to about 1.00 inches thick.

4. A method as defined by claim 3 in which said refined paper product of step (i) is a fiber product obtained by refining newsprint to produce a refined product having a bulk density of about one pound per cubic foot.

5. A method as defined by claim 4 in which the fibers in said fiber product are substantially in the form of the original fibers from which said newsprint was made.

6. A method as defined by claim 3 in which said aqueous emulsion of a synthetic resin in step (ii) also includes a wax and in which said blended product contains about 0.5 to about 2% wax on a 100% solids basis.

7. A method as defined by claim 3 in which said mat formed in step (iii) is vacuum-formed onto a forming screen and passed through a precompressor.

8. A method as defined by claim 3 in which said composite board produced by step (iv) has an internal particle or fiber to resin bond of at least 190 pounds per square inch, a modulus of rupture of at least 3,000 and, after a 24-hour soak test, a water adsorption of not more than 25% and a thickness swell of not more than 15%.

* * * * *